United States Patent [19]
Dail

[11] Patent Number: 5,765,097
[45] Date of Patent: Jun. 9, 1998

[54] SHARED HYBRID FIBER-COAX NETWORK HAVING REDUCED INGRESS NOISE IN THE UPSTREAM CHANNEL TRANSMITTED VIA A REPEATER

[76] Inventor: James E. Dail, 5 Cedar Ct., Marlboro, N.J. 07746

[21] Appl. No.: 650,683

[22] Filed: May 20, 1996

[51] Int. Cl.$^6$ .................................... H04N 7/173
[52] U.S. Cl. .................................... 455/5.1; 348/12
[58] Field of Search .................... 348/6, 7, 10, 11, 348/12, 13, 14, 15, 16, 17, 18; 455/3.1, 4.1, 4.2, 5.1, 6.1, 6.2, 6.3, 14; 375/211, 214; H04N 7/16

[56] References Cited

U.S. PATENT DOCUMENTS

| | | | |
|---|---|---|---|
| 3,835,393 | 9/1974 | Marron | 455/5.1 |
| 4,959,862 | 9/1990 | Davidov et al. | 455/6.1 |
| 5,390,337 | 2/1995 | Jelinek et al. | 348/12 |
| 5,408,259 | 4/1995 | Warwick | 348/6 |
| 5,499,047 | 3/1996 | Terry et al. | 348/6 |
| 5,528,582 | 6/1996 | Bodeep et al. | 370/24 |
| 5,534,912 | 7/1996 | Kostreski | 348/12 |
| 5,561,404 | 10/1996 | Ross | 375/214 |
| 5,606,725 | 2/1997 | Hart | 348/12 |

*Primary Examiner*—Christopher C. Grant
*Attorney, Agent, or Firm*—Robert B. Levy

[57] ABSTRACT

A hybrid fiber-coax network (100) includes at least one repeater ($220_1$) dispersed within a coax trunk ($22_1$) that carries video information downstream to a subscriber (14) and subscriber-originated information upstream to a fiber node (18). The repeater serves to digitally regenerate the subscriber-originated information to reduce ingress noise that would otherwise aggregate at the fiber node.

23 Claims, 3 Drawing Sheets

SHARED HYBRID FIBER-COAX NETWORK HAVING REDUCED INGRESS NOISE IN THE UPSTREAM CHANNEL TRANSMITTED VIA A REPEATER

TECHNICAL FIELD

This invention relates to a technique for providing reliable digital transmission and for reducing ingress noise in a shared hybrid-fiber-coax network that carries signals from a head end to individual subscribers and that carries information (voice, data or wide-band transmissions) from each subscriber to the head end.

BACKGROUND ART

Most existing Cable Television (CATV) systems provide one-way transmission of video signals, and possibly other information, from a CATV Head-end (HE) or telephone Central Office (CO) (hereinafter, collectively referred to as a "head end") to individual subscribers via a network of optical fibers and coaxial cables. The video information passes from the head end in an optical format (i.e., as an optical signal) for transmission across one or more fibers to a multiplicity of Fiber Nodes. At each Fiber Node, the video information is converted to an electrical signal and is transmitted through a "tree and branch" system of coaxial cables and amplifiers to individual subscribers. A typical Fiber Node (FN) serves communities of 500-2000 House-Holds Passed (HHP), each HHP representing a household premises or business location that is a potential subscriber.

Since CATV systems provide connections to many households and business locations, such systems have great potential for providing two-way transmission of other information (e.g. voice, data, video telephony, etc.). To upgrade existing CATV systems to support two way transmission of other information, the following is generally required:

1. The amount of amount of ingress noise that is aggregated together on each branch cable from individual subscribers must be reduced. To that end, additional Fiber Nodes are typically deployed to achieve 500 HHP/Node. The addition of more nodes usually requires significant re-engineering, not to mention higher costs associated with such additional nodes and the fiber needed to connect them to the head end, as well as the labor to reroute cables from the existing nodes to new ones.
2. To support such two-way transmission, fibers must be installed and connected between the head-end and each fiber-node site. Occasionally, extra fibers already run to existing fiber nodes. However, such extra fibers still must be routed and cross-connected to the new Fiber Nodes.
3. Two-way transmission also requires an upstream optical transmitter be installed at each Fiber Node to transmit signals originating at the subscriber premises back to the head-end.
4. An upstream optical receiver must be installed at the head-end.
5. All existing trunk amplifiers and line extender amplifiers in the coax plant must be retrofitted with upstream amplifiers. Many of these trunk and line amplifiers are physically ready for upstream amplifiers, so upstream amplifiers can easily be installed. Some reversal or rerouting of amplifiers may be necessary to accommodate the new Fiber Node locations.
6. Noise filters have to be installed at all or most subscriber premises (not just those requesting upstream service) to prevent ingress noise from corrupting the upstream signals.
7. If the cable terminating equipment at each subscriber premises is to be line-powered over the coax so as to prevent service outages during ac power failures, then the existing cable taps for drops to subscriber premises must be replaced by power splitting taps.

All of the above requires significant capital and labor expense. Also, most of foregoing must be accomplished in advance of offering two-way transmission. Moreover, the elements needed to accomplish two-way transmission are independent of the number of service subscribers, making the cost per subscriber high in areas where customer densities are low.

The driving force behind the upgrades discussed above is often signal quality, not bandwidth. Achieving high signal quality usually requires that the size of the area (i.e., the number of HHP) served by each fiber node be reduced to minimize ingress noise emanating from each subscriber and from the coax plant carrying the signals upstream to the head end. Decreasing the size of the service area requires more fiber and fiber nodes as well as the addition of noise filters. Once possible approach to resolving this problem is to employ so-called Mini-Fiber Nodes (MFNs) wherein additional fibers run to the trunk amplifiers in the cable plant. An optical transmitter and receiver are installed in the amplifier housings in the place of upstream amplifiers. This allows both wide bandwidth and good noise performance for the new services provided over these upstream and downstream fibers leading to trunk amplifiers. But still the cost of this upgrade is significant.

BRIEF SUMMARY OF THE INVENTION

To overcome the foregoing disadvantages, there is provided a shared hybrid-fiber-coax network for transmission of video information from a head end to one or more subscribers and for transmitting information from each subscriber to the head end. In accordance with the invention, information originating at the subscriber premises is first converted into a digital format via a digital receiver The digitized subscriber information is then digitally regenerated prior to re-transmission to the head end by at least one repeater. Each repeater, by its nature, will regenerate an essentially noise-free output signal for transmission upstream to the head-end if the signal-to-noise ratio of the regenerator input signal is adequate. From a noise perspective, deploying repeaters in this manner accomplishes the same effect as reducing the number of HHP served by each Fiber Node, without actually reducing the number of HHP that are served.

DETAILED DESCRIPTION

Figure 1:
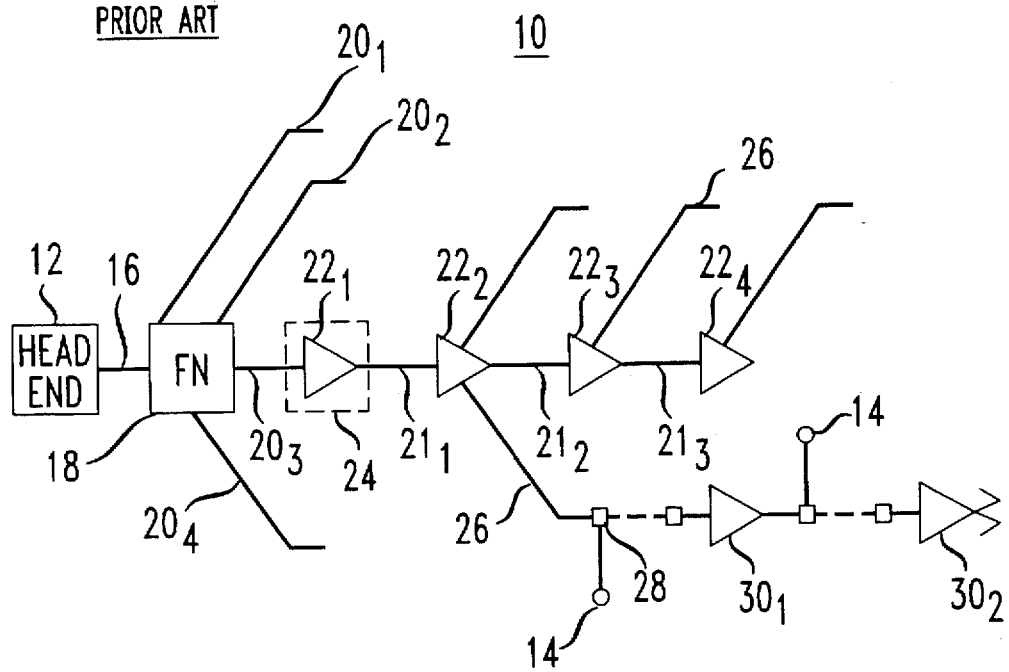
FIG. 1 is a block diagram of a shared hybrid fiber-coax system according to the prior art.

FIG. 1 shows a prior art shared hybrid fiber-coax network 10 for carrying information from a head end 12 to one or more subscribers 14—14 and for carrying information, in the form of voice, data, and/or wide band transmissions, from each subscriber back to the head end. The head end 12 may take the form of a CATV head end of a type known in the art. Alternatively, the head end 12 may take the form of a telephone central office. Thus, the term "head end," is intended to refer to either a conventional cable television head end or a telephone central office.

Within the network 10, video information originating at the head end 12 is typically transmitted in a optical format (as an optical signal) over one or more fibers (not shown) within a fiber cable 16 to at least one Fiber Node (FN) 18 that typically serves between 500 and 2000 HHP. At the FN 18, the downstream video information is converted into an electrical signal for distribution, typically on four separate coax trunks $20_1$-$20_4$. Each trunk, such as trunk $20_3$, may have typically four trunk amplifiers $22_1$-$22_4$ dispersed along its length for amplifying the electrical signal carried on the trunk. Each downstream trunk amplifier, such as amplifier $22_2$, is linked to an upstream amplifier by a corresponding one of trunk segments $21_1$-$21_3$, respectively. The trunk amplifiers, such as amplifier $22_1$, are each installed in a housing 24 that may include other equipment, such as a diplexer (not shown), that separates signals that originate from each subscriber 14 from those that are destined for the subscriber. In addition, the housing 24 may include an upstream amplifier module (not shown) and associated cabling. Many hybrid fiber-coax systems do not populate the trunk amplifiers $22_1$-$22_4$ with upstream amplifiers but are generally pre-wired for that purpose.

Each of the trunk amplifiers $22_1$-$22_4$ typically supplies downstream signals to a plurality of branches 26—26. One or more taps 28—28 are provided along each branch for connecting an individual one of the subscribers 14—14 to that branch. Just as each of the trunks $20_1$-$20_4$ typically includes one or more trunk amplifiers $22_1$-$22_4$ dispersed therealong, each branch 26 may include one or more branch amplifiers (or line extenders) $30_1$-$30_2$ dispersed along its length for amplifying the signals on that branch.

As discussed, the network 10 is shared because it carries information originating from each subscriber 14 upstream to the head end 12 as well as carrying information to each downstream subscriber from the head end. Information that originates from each subscriber 14 is carried by each branch to a corresponding one of the trunks $20_1$-$20_4$ for passage through one or more of the trunk amplifiers $22_1$-$22_4$ associated with that trunk. As discussed previously, each of the trunk amplifiers $22_1$-$22_4$ is typically housed with a diplexer (not shown) that separates the subscriber-originated signals from those originating from the head end. The subscriber-originated signals pass on each of the trunks $20_1$-$20_4$ (and possibly through one or more upstream amplifiers, not shown) to the FN 18 where such signals are converted into an optical format for transmission on one of the fibers in the fiber cable 16 to the head end 12.

One of the problems associated with the upstream transmission of subscriber-originated signals to the head end 12 is ingress noise. For purposes of discussion, ingress noise is defined as the combined noise originating at the subscribers 14—14 and the upstream plant (i.e., coax trunks and branches as well as the upstream trunk and/or branch amplifiers) that carry signals to the head end). One reason why ingress noise is a problem is that the noise originating with each subscriber 14 is aggregated with the noise from other subscribers (and from the upstream plant) at the FN 18. Thus, even though the noise originating from an individual one of the subscribers 14—14 may be small, the aggregated noise can be quite large and can adversely affect the quality of the subscriber-originated information transmitted upstream to the head end 12.

Figure 2:
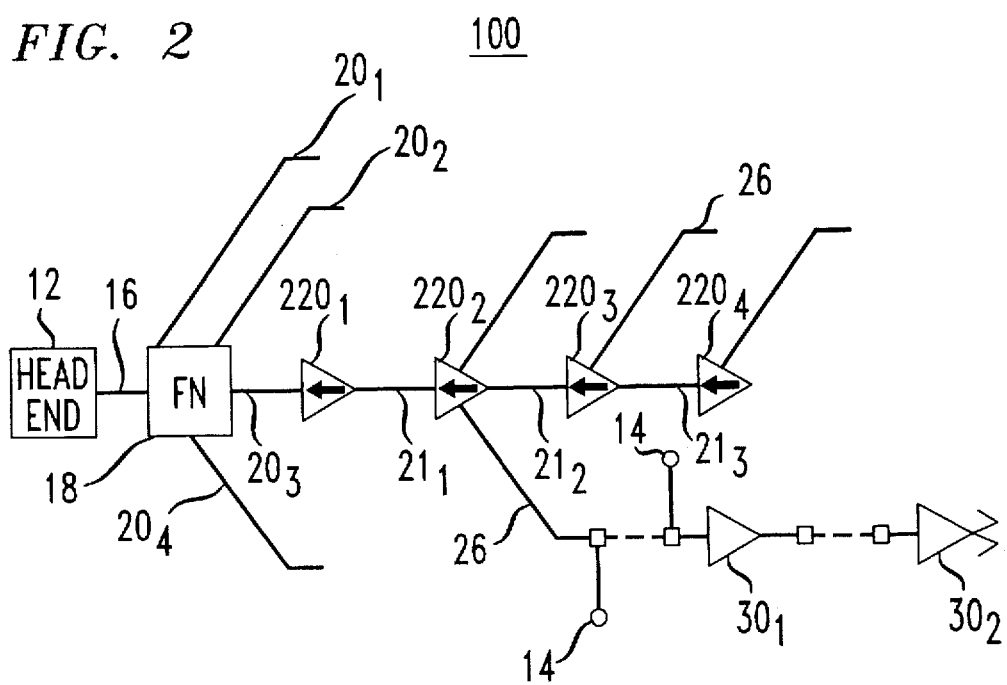
FIG. 2 is a block schematic diagram of a shared hybrid fiber-coax system in accordance with a preferred embodiment of the invention.

Referring to FIG. 2, there is shown a shared hybrid fiber-coax network 100 in accordance with a preferred embodiment of the invention for greatly reducing the incidence of ingress noise. The network 100 of FIG. 2 contains several elements in common with the network 10 of FIG. 1. Therefore, like numbers will be used to describe like elements. As with the network 10 of FIG. 1, the network 100 of FIG. 2 includes a fiber cable 16 for carrying information in an optical format from a head end 12 to at least one FN 18 where the information is converted to an electrical signal for distribution to individual subscribers 14—14 along trunks $20_1$-$20_4$ and branches 26—26. Information originating with each of the subscribers 14—14 passes upstream on the branches 26—26 to the trunks $20_1$-$20_4$ for receipt by the FN 18 that converts such information into an optical format for transmission on the fiber cable 16 to the head end 12. In some instances, the FN 18 may include block converters (not shown) on each trunk that shift the upstream band of frequencies of each coax branch so the frequencies can be summed and transported together on a single fiber back to the head end 12. This reduces the noise aggregation that would occur if each coax signal were just summed. In addition, by shifting the frequencies, more bandwidth is effectively allocated to each coax branch.

The network 100 of FIG. 2 differs from the network 10 of FIG. 1 in the following respect. As discussed, the network 10 of FIG. 1 includes a plurality of amplifiers $22_1$-$22_4$ disposed along each of the coax trunks $20_1$-$20_4$. Each of the amplifiers $22_1$-$22_4$ amplifies downstream signals passing from the head end 12 to the subscribers 14—14. Separate upstream amplifiers (not shown) may each be housed with a separate one of the downstream amplifiers $22_1$-$22_4$ for amplifying the upstream signals passing from the subscribers back to the head end. In contrast, the network 100 comprises a plurality of repeaters $220_1$-$220_4$. As will be discussed in greater detail with respect to FIG. 3, each of the repeaters $220_1$-$220_4$ amplifies the downstream electrical signals passing to the subscribers 14—14 representing information originating at the head end 12. However, unlike the upstream trunk amplifiers that may be present in the network 10, the repeaters $220_1$-$220_4$ within the network 100 of FIG. 2 advantageously digitally regenerate the subscriber-originated information destined for the FN 18. As long as the signal-to-noise ratio associated with the subscriber-originated information is not too low, the repeaters $220_1$-$220_4$ will regenerate the subscriber-originated information essentially error-free, thus virtually eliminating the problem of ingress noise. By digitally regenerating the subscriber-originated information, the repeaters $220_1$-$220_4$ achieve the same effect as reducing the number of HHP served by the FN 18 of FIG. 22 without any actual reduction of HHP that are served by the existing network without adding more fibers and/or fiber nodes.

The number of digital repeaters that must be deployed is dependent on the amount of ingress noise that is present in a particular CATV system and the amount of subscriber-originated information that must be carried. If the aggregated subscriber-originated information exceeds the capacity of an upstream channel, then multiple channels may be needed and multiple parallel repeaters, each of a construction similar to the repeater $220_1$, would be deployed. If the ingress noise is very high, it may be desirable to deploy digital repeaters in place of, or in addition to, each of the line extenders $30_1$ and $30_2$ to further reduce the amount of aggregated noise before digital regeneration. Conversely, if the ingress noise is low, and the aggregated user information bandwidth is low, then the number of digital regenerators needed can be reduced, requiring as few as one or two repeaters on each of the coax trunks $20_1$–$20_4$. In addition to, or in place of, the line extenders or trunk amplifiers, repeaters may also be employed at the coax inputs to each fiber node 18.

Figure 3:
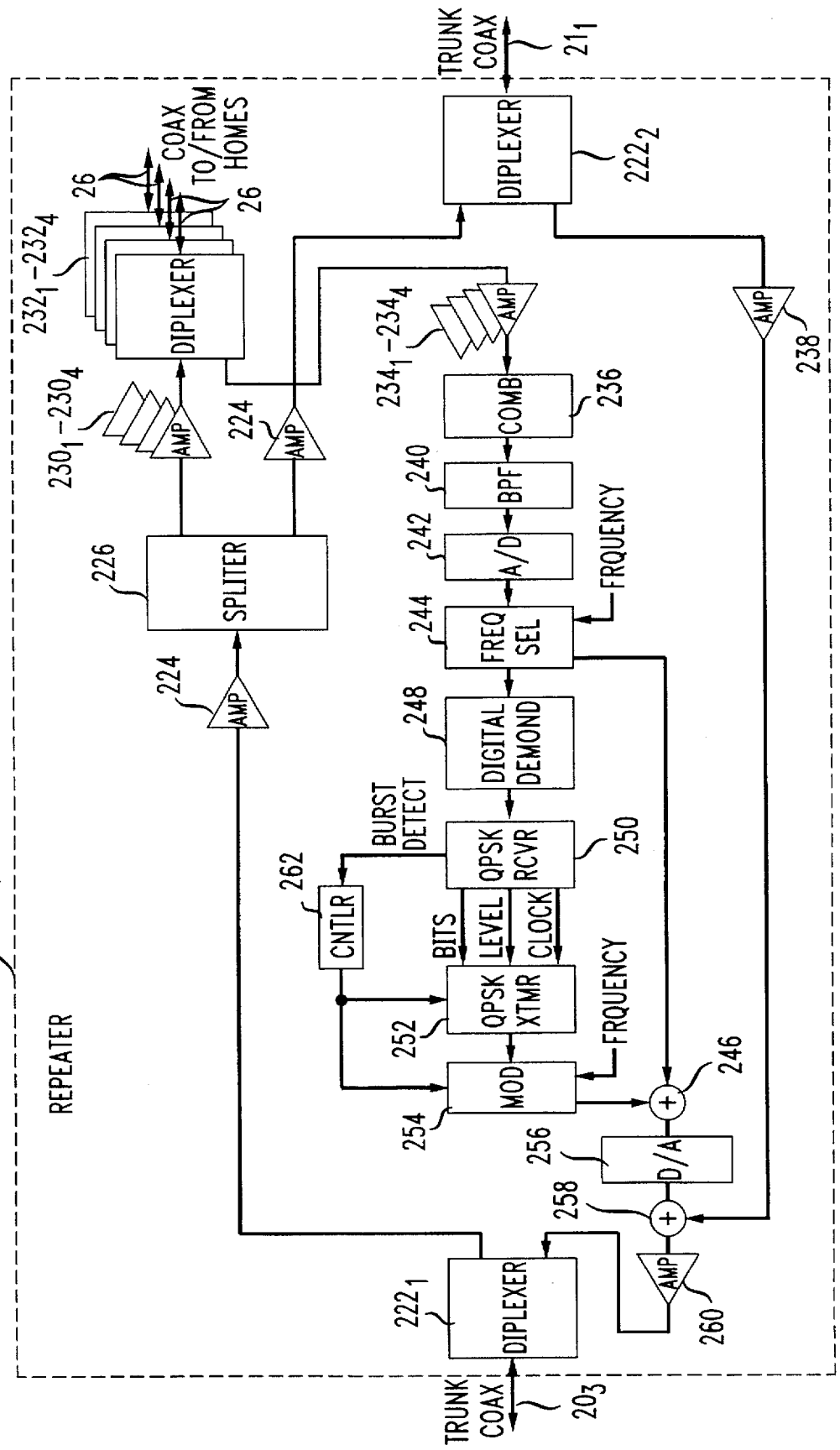
FIG. 3 depicts an exemplary embodiment of a digital repeater utilized with the shared hybrid-fiber-coax system of FIG. 2.

The repeaters $220_1$–$220_4$ share the same structure. Therefore, only the details of the repeater $220_1$ will be discussed. As seen in FIG. 3, the repeater $220_1$ includes a upstream diplexer $222_1$ that interfaces the repeater to the coax trunk $20_3$ upstream of the subscribers 14—14 of FIG. 2 to extract the information transmitted on the trunk that is destined for receipt by the subscribers. An amplifier 224 within the repeater $220_1$ of FIG. 3 amplifiers the downstream information separated from the coax trunk $20_3$ by the upstream diplexer $222_1$. The output signal of the amplifier 224 is split into a plurality of separate signals by a splitter 226. One of the split signals is amplified by an amplifier 228 prior to receipt by a downstream diplexer $222_2$ that is similar in construction to the upstream diplexer $222_1$. The diplexer $222_1$ interfaces the repeater $220_1$ to the trunk segment $21_1$ downstream of the upstream repeater $220_1$ to inject into the trunk segment the output signal of the amplifier 228 corresponding to the previously extracted downstream information. In addition to the amplifier 228, each of amplifiers $230_1$–$230_4$ may be provided for amplifying an individual one of the signals split by the splitter 226. Each of a plurality of branch diplexers $232_1$–$232_4$ injects the output signal produced by a corresponding one of the amplifiers $230_1$–$230_4$ onto an individual one of branches 26—26 that are coupled to the subscribers 14—14 of FIG. 2. In this way, the repeater $220_1$ functions to amplify incoming information on the trunk $20_3$ for ultimate distribution to the individual subscribers 14—14.

The downstream diplexer $222_2$ functions to strip the upstream-destined subscriber-originated information present on the trunk segment $21_1$ and deliver it to the amplifier 238 for later re-insertion into the continuing coax trunk $20_3$ by a summing amplifier 258 or amplifier 260 described hereinafter. In a similar fashion, each of the branch diplexers $232_1$–$232_4$ also strips subscriber-originated information that is present on the branches 26—26. The subscriber-originated information stripped by each of the branch diplexers $232_1$–$232_4$ is amplified by a separate one of amplifiers $234_1$–$234_4$ prior to receipt by a combiner 236. The combiner 236 combines the signals received from the amplifiers $234_1$–$234_4$ with the signal received from an amplifier 238 that amplifies the subscriber-originated information stripped from the branch segment $21_1$ by the downstream diplexer $222_2$.

The combiner 236 combines the all of the subscriber-originated information stripped by the diplexers $232_1$–$232_4$ to yield an output signal that is band-pass filtered by a band pass filter 240. An Analog-to-Digital (A/D) converter 242 digitizes the output signal received from the filter 240 to yield a digital signal that is input to a digital frequency-selecting filter 244. The filter 244 separates the digital signal received from the A/D converter into three bands based on a selectable set of frequencies allocated on the coax trunks by the cable operator. Within the first band are signals that are not digitally regenerated by the repeater $220_1$. Such signals may include some upstream analog signals as well as digital channels that are utilized for other services. Such digital signals may be of a different format or have a different modulation and thus, may not be capable of being regenerated. Signals within the first band are passed directly as an input to a summing amplifier 246 for transmission back towards the head end.

The signals separated by the filter 244 into the second band include those digital signals on the coax trunk $20_3$ in FIG. 3 (or on one of the other coax trunks $20_1$, $20_2$ or $20_4$ coupled to the same FN 18) that correspond to channels allocated to customers other than the subscribers 14—14 served by the repeater $220_1$. Signals within this band are blocked by the filter 244 to avoid adding local noise on coax branches 26—26 from adding signals created elsewhere in the system. The signals separated by the filter 244 in the third band include the subscriber-originated information extracted from the coax branches 26—26 via the diplexers $232_1$–$232_4$. Such signals are supplied to a digital demodulator 248 to select a particular frequency band for demodulation, typically a 2–6 MHz. band corresponding to a local digital channel.

A Quadrature Phase Shift-Key (QPSK) receiver 250 receives the demodulated signal from the demodulator 248. In accordance with the subscriber-originated information received from the demodulator 248, the receiver performs the following functions: (1) burst and level detection (i.e., detecting the existence and the level of the subscriber-originated information); (2) clock recovery (i.e., recovering the clock frequency associated with the digitized subscriber-originated information); (3) preamble detection (i.e., detecting the beginning portion of the subscriber-originated information); and (4) data recovery (i.e., recovering the subscriber-originated information).

The bits representing the digitized subscriber-originated information, together with clock signal corresponding to the clock frequency, and a level signal indicative of the received signal magnitude, are supplied by the QPSK receiver 250 to a QPSK transmitter 252. The QPSK transmitter 252 generates a digitized signal, indicative of the subscriber-originated information, in accordance with the bits, clock frequency, and level signal from the QPSK receiver 250. The level of the output signal generated by the QPSK transmitter 252 may be initially set during manufacture, or by an installer, or by the user. Alternatively, the level could be set based on the level of the signal received by from the QPSK receiver 250 which measures and checks the levels for each information burst from each subscriber. Information bursts whose levels that are too low or too high or have an invalid preamble are discarded. Further, the QPSK receiver 250 may also reject bursts that have an excessive error rate. In practice, the QPSK receiver 250 sends information back to the head end 12 (see FIG. 1) for each burst, allowing the head end to compare bursts for different subscribers on the same channel. The head end 12 can use this information to signal adjustments to the Consumer Premises Equipment (not shown) to adjust its transmitter output signal level. Further, the head end 12 may use such information, or other information, to derive a downstream signaling channel received by the repeater for the purpose of operations, performance monitoring, repeater configuration control and/or repeater software downloads.

The signal generated by the QPSK transmitter 252 is modulated back to its original upstream frequency or to a new frequency by a modulator 254 at a selectable frequency before being supplied to the summing amplifier 246. The output signal of the summing amplifier 246 is supplied to a Digital-to-Analog (D/A) converter 256 that converts the signal to an analog signal. This signal is then summed with the upstream signal on the trunk coax $21_1$ by the summing amplifier 258 and then is amplified by an amplifier 260 prior to being injected into the trunk $20_3$ by the upstream diplexer $222_1$.

A controller 262 controls the timing, level, and format of the QPSK transmitter 252 and the modulator 254 in accordance with a burst detect signal generated by the digital demodulator 248. When the digital demodulator 248 detects the presence of subscriber-originated information within the third band of signals supplied by the frequency selecting filter 244, the burst detect signal generated by the demodulator 248 becomes active. The detection may be in accordance with the level of the incoming signal, or in accordance with the preamble and clock signal of the incoming information. Alternatively, such detection may be in accordance with a valid error code rate. In response, the controller 262 gates the QPSK transmitter 252 and modulator 254. Thus, the QPSK transmitter 252 only transmits (thereby regenerating the output signal of the QPSK receiver 250), when subscriber-originated information is actually received. At all other times, the QPSK transmitter 252 and modulator 254 are inactive. In this way, background noise on the coax branches 26—26 is not regenerated, thereby preventing the accumulation (aggregation) of noise. In fact, any inputs that do not result in valid signal levels or preambles may be blocked by the controller 262.

In practice, each repeater, such as repeater $220_1$, regenerates the subscriber-originated information in a particular frequency band in a time slot associated with its coax trunk (e.g., coax trunk $20_3$ for the repeater $220_1$). However, this need not necessarily be the case. For example, each repeater could regenerate the subscriber-originated information in time slots from both a main and a branch coax trunk with the time slots being interleaved in a conventional TDMA manner. Alternatively, each ail 4 repeater could regenerate subscriber-originated information in time slots on either the local coax branch 26, or on the main coax trunk $21_1$, and share time slots with the other coax-trunks $20_2$–$20_4$ by selectively gating the repeater as necessary.

The above-described repeater can be modified in several ways to improve its performance.

1. Shared Channels

The repeater functionality has been described assuming that each repeater, such as repeater $220_1$, has a single dedicated radio-frequency (RF) channel assigned to the subscribers served by that trunk amplifier/repeater site. Other subscribers and repeaters would be assigned different frequencies to prevent collisions in user transmissions, and to prevent noise from separate groups of users from accumulating and thereby degrading performance.

Alternatively, it may be desirable to use a single channel whose bandwidth is time divided over more than one repeater location. This sharing could be implemented by assuming differing time-slots within the same frequency band to separate users along different coax trunks, such as trunks $20_1$–$20_4$, into the FN 18, as seen in FIG. 2, or at multiple repeaters $220_1$–$220_4$ along a given coax trunk. There are several possible reasons for such channel sharing:

1. For scenarios with low service penetrations or low bandwidth requirements, shared channels would allow better utilization of the limited upstream coax bandwidth.
2. To allow the use of a fewer number of digital channels, presumably with a higher bandwidth and bit rate, plus their corresponding head-end receivers, to save cost.
3. To support the higher bandwidth efficiency and service flexibility achievable with wider channels due to economies of scale in sharing and less bandwidth waste due to channel rolloffs and guard regions. The inherent nature of TDMA, or similar multiplexing formats such as CDMA or ATM, would permit sharing of time-slots (or their equivalent for other multiplexing techniques) in this manner.

However, for a hybrid fiber-coax system with repeaters, a new issue arises. Each repeater, such as repeater $220_1$, outputs a noise-free replica of the information (plus noise) which enters from the coax branches 26—26. The noise-free output of one repeater, such as repeater $220_2$, would then be pass through the trunk coax $21_1$ to be combined with the output of a second repeater (repeater $220_1$). Unfortunately, any noise which enters the trunk coax between the repeaters will add to the output signal of repeater $220_2$, and later accumulate with further noise on the trunk $20_3$ or on the other coax trunks $20_2$–$20_4$. To avoid this noise accumulation, it is possible to cause the output of the preceding repeater (say repeater $220_2$) and trunk coax (say trunk $21_1$) to be combined with the inputs from the local coax branches 26—26 and pass through the repeater $220_1$. This would essentially regenerate the signal for a second time, thereby removing any additive noise again to create another noise-free output signal on the trunk coax $20_3$. This "tandem repeating" is similar to the conventional repeating functions of telephony T1 or optical repeaters, but differs significantly due to the multiple access nature of the shared coax medium. Tandemed burst repeaters with distributed users and noise sources are unique to a repeatered, hybrid fiber-coax, access system.

Figure 4:
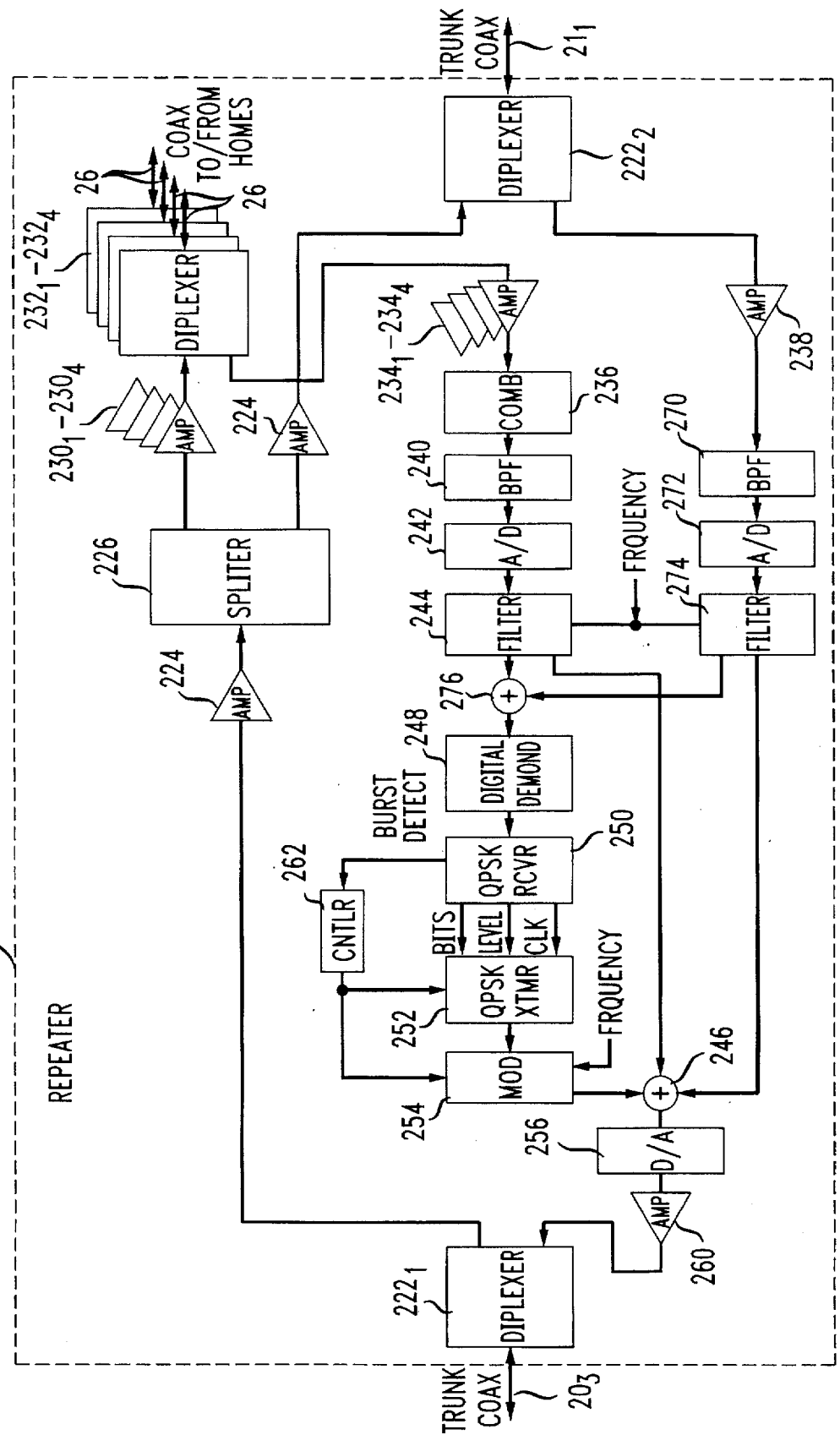
FIG. 4 depicts a second exemplary embodiment of a digital repeater utilized with the shared hybrid-fiber-coax system of FIG. 2.

A block diagram of a modified repeater $220_1'$ is shown in FIG. 4. It is essentially identical to the repeater $220_1$ of FIG. 3 and like numbers have been used. The repeater $220_1'$ differs in terms of the handling of the upstream trunk coax signal from diplexer $222_2$ and amplifier 238. In the repeater $220_1'$, the output of amplifier 238 passes through a band-pass filter 270, analog to digital converter 272, and digital filter 274 in a manner similar to the local coax signals from amplifiers $234_1$–$234_4$. The outputs of the local trunks 26—26, filtered via filter 244, and the trunk coax $21_1$, filtered via filter 274, would be combined by adder 276 and then regenerated as in FIG. 3. With the arrangement of repeaters as seen in FIG. 4 and input time multiplexing, the repeater $220_1'$ would regenerate information bursts from local users on trunks 26—26, or more distant repeaters $220_2$, which occur in differing time-slots of the same frequency.

Unlike filter 244 which block all digital channels which were not regenerated, filter 274 routes all channels (other than the regenerated channel which it sends to adder 276) to adder 246 for amplification and re-transmission on coax trunk $20_3$.

Unfortunately, this implementation of FIG. 4 adds to the hardware complexity and only clears the noise in the regenerated channel. Any noise injected on the trunk coax $21_1$ by customer taps or cable ingress will still be able to degrade the output signal from the repeater $220_2$ which is more distant from the head-end. Generally, there are only a limited number of taps on the trunk coax, so this source of noise should be minimal. The only practical remedy to this is to deploy repeaters on all channels at each repeater site, thereby eliminating any ingress noise from the trunk coax $21_1$ between repeaters via a second or subsequent regeneration.

1.1 Shared Channels without Taps on a Trunk Coax

In many cable systems, all customer taps are installed on the coax branches 26—26 off the trunk amplifiers, or after line extenders (amplifiers) located on those coax branches. Consequently, the coax trunk between trunk amplifiers has relatively low ingress noise-limited primarily by the electrical noise in the electronics and the ingress which enters the cable due to imperfect coax shielding or connectors. For such applications, it is possible to simply combine the input from the trunk coax $21_1$ with the inputs from the branch coaxes 26—26 by summing the amplifier 238 output into combiner 236 in FIG. 4. This eliminates the need for duplicating the band-pass filters 240 with filter 270, the A/D converter 242 with filter 272, or the frequency selective filter 244 with filter 274.

2. Channel Bandwidth

Basically, there is no restriction on channel bandwidth specific to the above-described regeneration method. Channels with 2 or 6 MHz bandwidth are already used in connection with CATV and Hybrid-Fiber-coax systems. These bandwidths, as well as other bandwidths, are applicable to the instant regeneration method. It is generally easier to find a cleaner narrow-band channel than a wider band channel due to ingress noise. However, a wider channel provides better concentration or statistical multiplexing (bandwidth utilization) than a multiplicity of narrow-band channels with the same overall bandwidth. An optimum selection of bandwidth depends on the particular noise environment, service traffic needs, and implementation complexity.

3. Multiple Channels

A second alternative exists wherein the bandwidth required exceeds the capacity of a single upstream channel, even if its bandwidth were increased as previously described. This may occur because the upstream channel cannot be made arbitrarily large due to restrictions on available bandwidth in the cable system, conflicting channel assignments for other services, or ingress noise which restricts the range of usable frequencies. With multiple channels, each trunk amplifier site must have multiple independent repeater functions-one for each frequency band on the coax. This can be implemented by replicating the functionality of repeater $220_1$ in FIG. 3 or repeater $220_1'$ in FIG. 4, by creating a single function which is capable of working at sufficient speed with time-sharing to process information bursts from both digital upstream channels.

4. Block Conversion at each Fiber-Node 18

Block conversion is another possible method that could be employed to increase the effective upstream bandwidth. Using this technique, the upstream frequency bands of the trunks $20_1$–$20_4$ entering each FN 18 of FIG. 2 are each frequency shifted as a block to stack them one above the other. This allows the bandwidth on each of the coax trunks $20_1$–$20_4$ entering each FN 18 to be independent from both a capacity and noise perspective. Since block conversion in each FN 18 is generally performed via analog modulation, block conversion can be applied independently of, but in conjunction with, digital upstream repeaters.

5. Modulation and Multiplexing Formats

The choice of modulation and multiplexing formats on the coax system is based on a tradeoff among bandwidth efficiency, noise immunity, and implementation complexity or cost. Many modulation formats are available which are more bandwidth efficient than QPSK and will be described below. However, they often do not lend themselves readily to multiple access topologies or noisy environments.

For the embodiment described above, with a dedicated band of frequencies allocated to each repeater, the repeater outputs are effectively point-to-point and low noise (i.e., often with no customer taps or significant ingress noise on the trunk coax $20_3$ returning to the FN 18). Here, it may be possible in some applications to replace the burst QPSK transmitter 252 shown in FIG. 3 with a continuous transmitter with a more efficient modulation format as described hereinafter. The change from a burst (e.g., TDMA) environment to a continuous transmission allows much of the multiplexing overhead (e.g., guard times, preambles, ranging signals, etc.) to be eliminated-significantly increasing overall bandwidth efficiency.

5.1 Alternative Modulation Formats 5.1.1 Single-carrier Modulation

The upstream digital capacity of each of the repeaters $220_1$–$220_4$ could be increased by employing a more bandwidth efficient modulation scheme like Quadrature Amplitude Modulation (QAM), Vestigial Side Band (VSB), Discrete Multi-Tone Modulation (DMT), Carrierless Amplitude and Phase Modulation (CAP), etc. To that end, the transmitter 252 would be appropriately configured to employ one of these modulation schemes in place of QPSK. However, QAM, VSB and DMT are somewhat more complex than QPSK. Moreover, these modulation techniques generally require a higher signal-to-noise ratio (SNR) and may be affected by phase jitter caused by multiple transmitters in a Time Division Multiplex Arrangement (TDMA) access system.

Using the repeaters $220_1$–$220_4$ may reduce the ingress noise enough to achieve a sufficiently high Signal-to-Noise ratio to allow QAM, DMT, VSB or other modulation techniques on each of the trunks $20_1$–$20_4$ back to the head end 12. Since there are generally no subscriber taps connected along these trunks, ingress noise on these trunks should be minimal.

Also, the transmitter 252 within each repeater could be operated in a continuous, point-point mode to prevent the accumulated phase jitter introduced by multiple access systems. Operating the transmitter 252 in each repeater in such a way would also eliminate the need for the typical TDMA overhead associated with guard times, preambles, and perhaps even less error detection/correction. Continuous operation would require receiving each burst; stripping it of its preamble, guard time etc.; and transmitting the burst at a shifted time, channel or time slot. Indeed, incoming signals could be converted from a burst multiple-access mode to a continuous, point-to-point mode having the same or a different modulation format.

5.1.2 Multicarrier Modulation

Discrete Multi-Tone (DMT) and Discrete Wavelet Multi-Tone (DWMT) are examples of multicarrier modulation methods that could be employed by each of the repeaters $220_1$–$220_4$. These modulation techniques divide the single digital upstream channel into multiple, coordinated "frequency" bands by using an orthogonal transform technique. Such coordinated, narrow frequency bands may each require less equalization and can minimize the effect of narrow-band ingress noise via error correction across bands or bandwidth management to disable bands with poor performance.

6. Channel Filtering and Selection

When a channel is shared by a group of subscribers 14—14 connected to a set of branches 26—26 supplied from a trunk amplifier, such as amplifier $22_1$ of FIG. 1, the effect of ingress noise from those homes is virtually removed by substituting the digital repeater $220_1$ for the trunk amplifier. However, the noise from other customers served by the same repeater may fall into the same band and contaminate the channel. One way to reduce this unwanted ingress noise is to supply a filter which blocks the entire upstream band for each subscriber premises 14 that does not subscribe to digital services, thereby preventing them from adding noise to an upstream channel. This technique can be applied in conjunction with the repeaters $220_1$–$220_4$ to further reduce ingress noise, if necessary.

6.1 Analog Filtering

Each of the repeaters $220_1$–$220_4$ uses digital filtering (provided by way of the filter 244) to select the desired input frequency band and digital modulation by way of the modulator 254 to move the regenerated output signal back to its original frequency allocation. It is also possible to perform these functions with an analog demodulator, an analog modulator and filter, potentially using intermediate-frequency (IF) devices (not shown) to double heterodyne the signal and use low cost, sharp cutoff filters (e.g. SAW devices, not shown).

6.2 Digital Filtering

In digital filtering, the analog signal is first sampled and digitized. Then the desired channel is selected by either using digital demodulation and filtering via the filter 248, or by using a digital transformation like Discrete Fourier Transform (DFT). Generally, digital filtering can result in better channel selectivity and fewer components.

7. Physical Location

The repeaters $220_1$–$220_4$ each can be located in the same housing 24 (see FIG. 1) as the trunk amplifiers $22_1$–$22_4$, or at the FN 18, or at the head end 12. Most deployed trunk amplifiers already have space, power, and connections for upstream amplifiers, which may also be used for an upstream repeater. Alternatively, a separate box (not shown) may be provided adjacent to a trunk amplifier, such as the trunk amplifier $22_1$, or adjacent to the FN 18, to accommodate a repeater, such as the repeater $220_1$ with the trunk amplifier or FN 18. These separate units could be spliced directly into the coax trunk or be connected via an umbilical cable (not shown).

8. Downstream Channel

In the illustrated embodiment shown in FIG. 3, the repeaters $220_1$–$220_4$ have not been described as including connections to, or modifications of, any downstream channels so as to be compatible with existing downstream amplifiers, housings and wiring. However, it may be desirable to include a downstream receiver, particularly in new systems or for deployment within separate repeater housings. The downstream connection could be used to provide a clock and framing reference for the upstream receiver, as well as to aid in operations or fault location via functions such as loop backs, configuration changes, software downloads, status monitoring etc.

The foregoing describes a digital, burst-type regenerator for use in a shared hybrid fiber-coax system to reduce the effects of ingress noise.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for reducing aggregated ingress noise in a shared fiber-coax network that carries information from a head end to a plurality of subscribers via at least one main coax trunk and for carrying information originated by said plurality of subscribers to said head end via said main coax trunk using a repeater, the method comprising the steps of:
   aggregating onto the main coax information generated by said plurality of subscribers;
   digitizing the aggregated subscriber-originated information; and
   digitally regenerating the digitized aggregated subscriber-originated information to reduce the incidence of noise in the aggregated subscriber-originated information on the main coax.

2. The method according to claim 1 wherein the step of regenerating the subscriber-originated information includes the steps of:
   filtering the digitized subscriber-originated information to pass the information in a preselected band;
   demodulating the information within the preselected band;
   receiving the demodulated information via a receiver having a prescribed modulation format
   transmitting the information received by the receiver in accordance with said prescribed modulation format;
   modulating the transmitted information; and
   injecting the transmitted information into the trunk coax.

3. The method according to claim 2 wherein the filtering step includes the step of bypassing subscriber-originated information that is not within the preselected band.

4. The method according to claim 2 wherein the filtering step includes the step of blocking information within the preselected band for non-regeneration to allow use of such information by a second repeater without adding any noise at said second repeater.

5. The method according to claim 2 wherein the prescribed modulation format is Quadrature Phase Shift Keying.

6. The method according to claim 2 wherein the prescribed modulation format is Quadrature Amplitude Modulation.

7. The method according to claim 2 wherein the prescribed modulation format is Carrierless Amplitude Modulation.

8. The method according to claim 2 wherein the prescribed modulation format is Digital Multi-Tone.

9. The method according to claim 2 wherein the prescribed modulation format is Digital Wavelet Multi-Tone.

10. The method according to claim 1 wherein the subscriber-originated information is regenerated in multiple frequency bands.

11. The method according to claim 1 wherein the subscriber-originated information is regenerated by receiving the information via a single receiver and then transmitting the received information via a single transmitter.

12. The method according to claim 1 wherein the subscriber-originated information is regenerated by receiving the information with multiple receivers and then transmitting the information via multiple corresponding transmitters.

13. The method according to claim 1 wherein the subscriber-originated information is regenerated at a preset output level.

14. The method according to claim 1 wherein the subscriber-originated information is regenerated at an output level dependent on the input level of the received information.

15. The method according to claim 1 wherein the subscriber-originated information is regenerated in a particular frequency band in at least one time slot associated with said main coax trunk.

16. The method according to claim 1 wherein the subscriber-originated information is regenerated in a particular frequency band in time slots shared with multiple repeaters on at least one coax trunk.

17. The method according to claim 1 further including the step of utilizing downstream signal information for clock and framing reference purposes.

18. The method according to claim 1 wherein the digitally regenerated subscriber information passes on said coax and is digitally regenerated by a second repeater.

19. The method according to claim 2 wherein the said information having said prescribed modulation format comprises a burst, multiple access signal and wherein said signal is converted into a continuous point-to-point signal.

20. The method according to claim 19 wherein the continuous point-to-point signal has a modulation format the same as said burst, multiple access signal.

21. The method according to claim 19 wherein the continuous point-to-point signal has a different modulation format from said burst, multiple access signal.

22. The method according to claim 1 including the step of deriving a downstream signaling channel received by the repeater for the purpose of operations, performance monitoring, repeater configuration control and repeater software download.

23. A method for reducing aggregated ingress noise in a shared fiber-coax network that carries information from a head end to a plurality of subscribers via a main coax and for carrying information originated by said plurality of subscribers to said head end via said main coax, the method comprising the steps of:

aggregating information originated by said plurality of subscribers onto the main coax;

digitizing the aggregated subscriber-originated information;

extracting the digitized aggregated subscriber information lying within a first prescribed bandwidth; and digitally regenerating the digitized aggregated subscriber-originated information within said first prescribed bandwidth to reduce the incidence of noise in the aggregated subscriber-originated information on the main coax.

* * * * *

UNITED STATES PATENT AND TRADEMARK OFFICE
CERTIFICATE OF CORRECTION

PATENT NO. : 5,765,097

DATED : June 9, 1998

INVENTOR(S) : James E. Dail

It is certified that error appears in the above-identified patent and that said Letters Patent is hereby corrected as shown below:

On the title page, insert item [73] Assignee --AT&T Corp. New York, New York--.

Signed and Sealed this

Tenth Day of August, 1999

Attest:

Q. TODD DICKINSON

*Attesting Officer*   Acting Commissioner of Patents and Trademarks